United States Patent
Iammatteo et al.

[11] Patent Number: 6,165,087
[45] Date of Patent: Dec. 26, 2000

[54] FIGURE-EIGHT SHAPED DRIVE BELT

[75] Inventors: Pat A. Iammatteo; Jonathan Petzold, both of Parlin, N.J.

[73] Assignee: I. F. Associates, Inc., Parlin, N.J.

[21] Appl. No.: 09/350,382

[22] Filed: Jul. 8, 1999

[51] Int. Cl.[7] .............................. F16H 63/00; F16H 7/02; F16G 5/00
[52] U.S. Cl. .................. 474/7; 474/167; 474/265
[58] Field of Search ................... 474/237, 265, 474/273, 7, 141, 167

[56] References Cited

U.S. PATENT DOCUMENTS

| | | | |
|---|---|---|---|
| 2,347,798 | 5/1944 | Reiling | 474/265 |
| 3,740,784 | 6/1973 | Morrissey | 15/21 A |
| 3,850,357 | 11/1974 | Lace | 226/178 |
| 4,324,147 | 4/1982 | Crawford, III | 474/237 |
| 5,066,344 | 11/1991 | Inami et al. | 156/138 |
| 5,830,983 | 11/1998 | Alex et al. | 474/265 |
| 5,895,367 | 4/1999 | Mautoni | 602/32 |

*Primary Examiner*—David A. Bucci
*Assistant Examiner*—Matthew A. Kaness
*Attorney, Agent, or Firm*—Ezra Sutton

[57] ABSTRACT

A figure-eight shaped drive belt for use within a pulley system, including a drive belt having a preformed figure-eight configuration. The figure-eight configuration includes a first circular-shaped loop and a second circular-shaped loop, such that the first and second circular-shaped loops are each integrally connected at two curved center sections to form an endless drive belt having the figure-eight shaped configuration. The figure-eight shaped drive belt is made from a non-expandable plastic resin material selected from the group consisting of polyurethane, polyolefins, styrenic, polyesther and other thermoplastic resins. Alternatively, the invention also relates to elliptical and oval shaped drive belts for similar uses.

20 Claims, 10 Drawing Sheets

STEP 4
INJECTING THE MOLTEN RESIN MATERIAL 22

440

442 — 4A: THE MOLTEN RESIN MATERIAL 22 IS NOW TRANSFERRED AND INJECTED INTO A COOLED MOLDING UNIT 40 SUCH AS A CONVENTIONAL OR RUNNERLESS INJECTION MOLD 42, OR A HOT-RUNNER INJECTION MOLD 44, OR A HOT/COLD RUNNER INJECTION MOLD 46. MOLTEN RESIN MATERIAL 22 IS THEN INJECTED BY THE SAME FEED SCREW 424 (NOW ACTING AS A PLUNGER) TRANSFERS TO THE MOLTEN RESIN MATERIAL 22 WITHIN THE MOLDING UNIT 40.

444 — 4B: THE MOLTEN RESIN MATERAIL 22 IS NOT FED INTO ONE OR MORE HEATED FEEDING TUBES 52 CONNECTED TO THE MOLDING UNIT 40 AND THE MOLTEN RESIN 22 ENTERS ONE OR MORE FEED POINTS/GATES 54A AND 54B, WITHIN EACH OF THE SHAPED MOLD CAVITY SECTIONS 56A TO 56D IS LESS THAN 8 INCHES.

446 — 4C: THE MOLTEN RESIN MATERIAL 22 IS ALLOWED TO FILL EACH OF THE SHA[ED MOLD CAVITY SECTIONS 56A TO 56D, SUCH THAT THE MOLTEN RESIN MATERIAL 22 FILLS A PAIR OF OPPOSING OVERFLOW SLUG CAVITIES 58A AND 58B LOCATED AT EACH OF THE CURCULAR-SHAPED, SEMICIRCULAR-SHAPED OR ARC-SHAPED LOOPS 24 AND 26; 124 AND 126; AND 224 AND 226 OF SHAPED DRIVE BELTS 10, 100 AND 200, RESPECTIVELY. THESE OVERFLOW SLUG CAVITIES 58A AND 58B HAVING MOLTEN RESIN MATERIAL 22 THEREIN FORM SLUGS 60A AND 60B WHICH ARE USED TO EJECT OR DEMOLD THE SHAPED DRIVE BELT 10, 100 OR 200 FROM THE MOLDING UNIT 40. ALSO, AN OVERFLOW SLUG 62 IS FORMED WITHIN A THIRD OVERFLOW SLUG CAVITY 58C FROM FEED GATES 54A AND 54B WHICH IS ALSO USED TO DEMOLD THE SHAPED DRIVE BELT 10, 100 OR 200 FROM THE MOLDING UNIT 40.

STEP 5
COOLING OF THE MOLTEN RESIN MATERIAL 22

450 — THE MOLTEN RESIN MATERIAL 22 IS THEN COOLED WITHIN THE MOLD CAVITY SECTIONS 56A AND 56D; AND SLUG CAVITIES 58A AND 58B AND FEED GATES 54A AND 54B WHICH FORM SLUGS 60A, 60B AND 62, RESPECTIVELY. THE THERMOPLASTIC RESIN MATERIAL 22 IS COOLED TO A SOLID STATE VIA WATER COOLED CHANNE;S 438 WITHIN THE COOLED MOLDING UNIT 40 FOR A SPECIFIC TIME PERIOD.

FIGURE-EIGHT SHAPED DRIVE BELT

FIELD OF THE INVENTION

This invention relates to a dog bone or bow tie or figure-eight shaped drive belt for use in equipment in the U.S. Postal Service, or any pulley/belt driven equipment. More particularly, the figure-eight shaped drive belt facilitates the installing of a plurality of these shaped drive belts within the pulley systems of the mail sorting equipment and/or other pulley belt driven equipment. Alternatively, the invention also relates to elliptical and oval shaped drive belts for similar uses.

BACKGROUND OF THE INVENTION

Conventional drive belts for mail sorting equipment being used by the mail sorting centers of the U.S. Postal Service are currently round in shape and have a circular cross-section. These round in shape drive belts are produced by means of heat-welding and grinding of a continuously extruded shape, or produced by the injection molding of a single piece by means of a circular injection mold.

There remains a need for a figure-eight shaped drive belt having a circular cross-section in order to facilitate the easy installation of the shaped drive belts within the pulley systems of the mail sorting equipment. Additionally, the figure-eight shaped drive belt will allow for a simpler and more economical construction of a runnerless or hot-runner or combination hot/cold injection mold. This figure-eight shaped drive belt will also provide for a shorter flow of the molten resin material during the filling injection process, resulting in a stronger and higher quality drive belt part. The figure-eight shaped drive belt will also provide for a reduced tooling size of the injection mold, as compared to the conventional round-shaped injection mold.

DESCRIPTION OF THE PRIOR ART

Circular or round shaped drive belts with V-shaped or trapezoidal shaped cross-sections having various designs, structures and materials of construction have been disclosed in the prior art. For example, U.S. Pat. No. 5,066,344 to INAMI et al discloses a process for producing an endless drive belt. The endless drive belt includes a belt main body formed from a liquid castable elastomeric material, a reinforcing fabric covering the surface of the belt main body and a shock absorbing layer of elastomeric material formed between the belt main body and the fabric. The endless drive belt is shaped in the form of a flat belt or a belt having projections on at least one side of the belt main body.

None of the prior art patents disclose or teach a shaped drive belt having a figure-eight configuration for use within a pulley system of a mail sorting apparatus that provides longevity of use and minimum of down-time in operation.

Accordingly, it is an object of the present invention to provide a dog bone, bow tie or figure-eight shaped drive belt for use in mail sorting equipment in the U.S. Postal Service.

Another object of the present invention is to provide a figure-eight shaped drive belt in order to facilitate the easy installation of the shaped drive belts within the pulley systems of the mail sorting equipment, or other similar equipment.

Another object of the present invention is to provide a figure-eight shaped drive belt that allows for a simpler and more economical construction of a conventional runnerless, or hot-runner, or hot/cold injection mold.

Another object of the present invention is to provide a figure-eight shaped drive belt that allows for a shorter flow of the molten resin material during the filling injection process which results in a stronger and higher quality drive belt part with respect to wear, endurance and useful life of the drive belt.

Another object of the present invention is to provide a figure-eight shaped drive belt that allows for a reduced tooling size of the injection mold, as compared to the conventional round shaped injection mold in present use.

Another object of the present invention is to provide a figure-eight shaped drive belt that allows for smaller packaging, thus less costly.

A further object of the present invention is to provide a figure-eight shaped drive belt that can be mass produced in a single or multiple cavity mold being manufactured in an automated and economical manner and is readily affordable by the user.

SUMMARY OF THE INVENTION

In accordance with the present invention, there is provided a figure-eight shaped drive belt for use within a pulley system. The drive belt includes a preformed figure-eight configuration having a first circular-shaped loop and a second circular-shaped loop. The first and second circular-shaped loops each being integrally connected at two curved center sections to form an endless drive belt having the figure-eight shaped configuration. The figure-eight shaped drive belt is made from a injection moldable thermoplastic elastomeric plastic resin material selected from the group consisting of polyurethane, polyolefins, styrenic, polyesther and other thermoplastic resins. Alternatively, the invention also relates to elliptical and oval shaped drive belts for similar uses.

BRIEF DESCRIPTION OF THE DRAWINGS

Further objects, features, and advantages of the present invention will become apparent upon the consideration of the following detailed description of the presently-preferred embodiment when taken in conjunction with the accompanying drawings, wherein:

FIG. 9B is a schematic block diagram of the process method of producing a figure-eight shaped drive belt showing the steps of injecting the molten resin material and cooling of the resin material;

DETAILED DESCRIPTION OF THE PREFERRED AND ALTERNATE EMBODIMENT

Preferred Embodiment 10

Figures 1, 2:
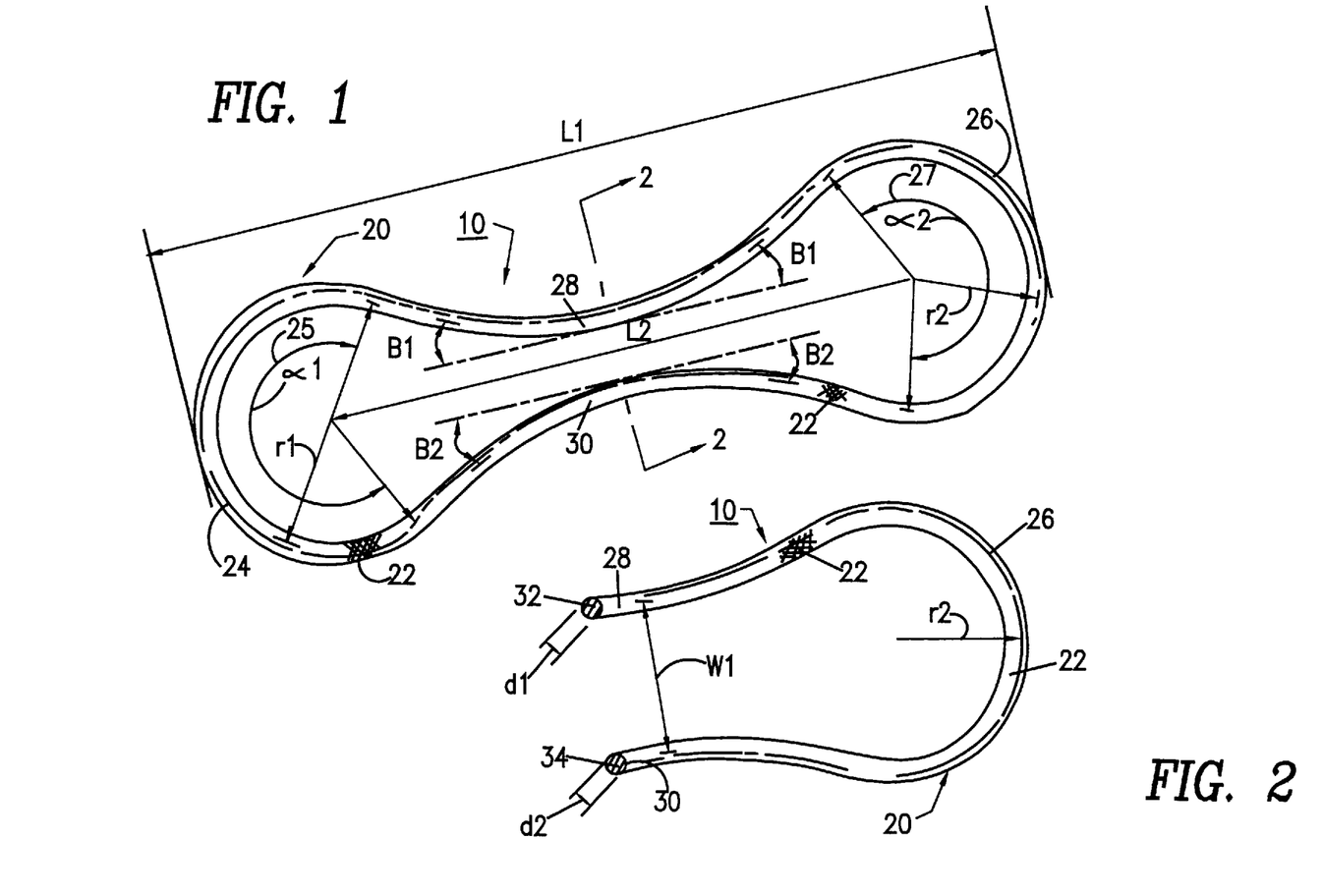
FIG. 1 is a front perspective view of the figure-eight shaped drive belt of the preferred embodiment of the present invention showing the shaped drive belt having first and second circular looped ends being integrally connected at two inwardly tapered center sections.
FIG. 2 is a front perspective view of the figure-eight shaped drive belt of the present invention taken along lines 2—2 of FIG. 1 showing the first and second circular cross-sectional areas of the two inwardly tapered center sections of the shaped drive belt.
Figure 2A:
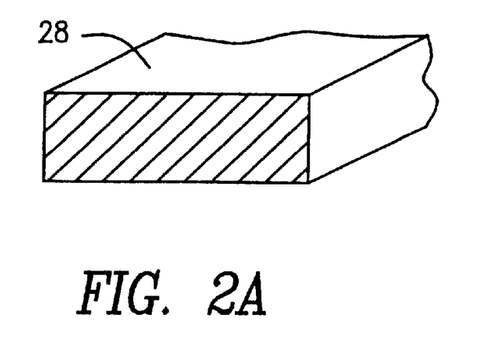
FIGS. 2A, 2B, 2C, and 2D are front perspective sectional views of the dog bone shaped drive belt showing it in the shape of a rectangle, a square, a triangle and a trapezoid.
Figure 2B:
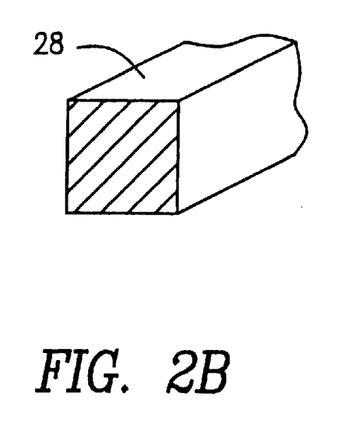
Figure 2C:
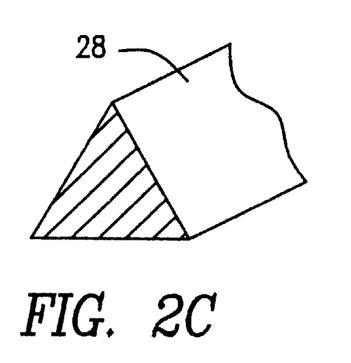
Figure 2D:
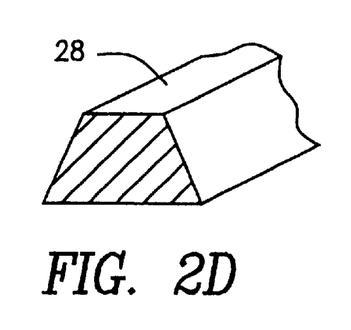
Figure 7A:
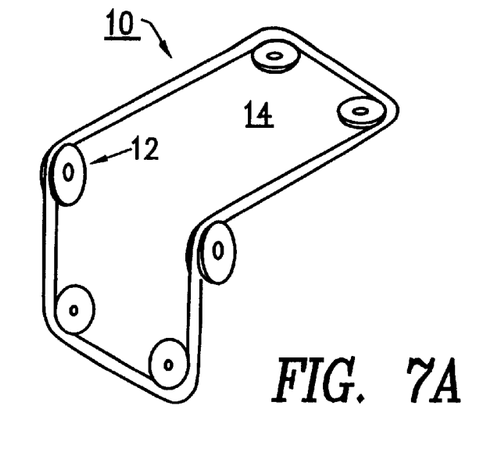
FIG. 7A is a front perspective view of the figure-eight shaped drive belt of the present invention showing the shaped drive belt within a pulley system having multiple pulleys therein being used in an operational mode.
Figure 8:
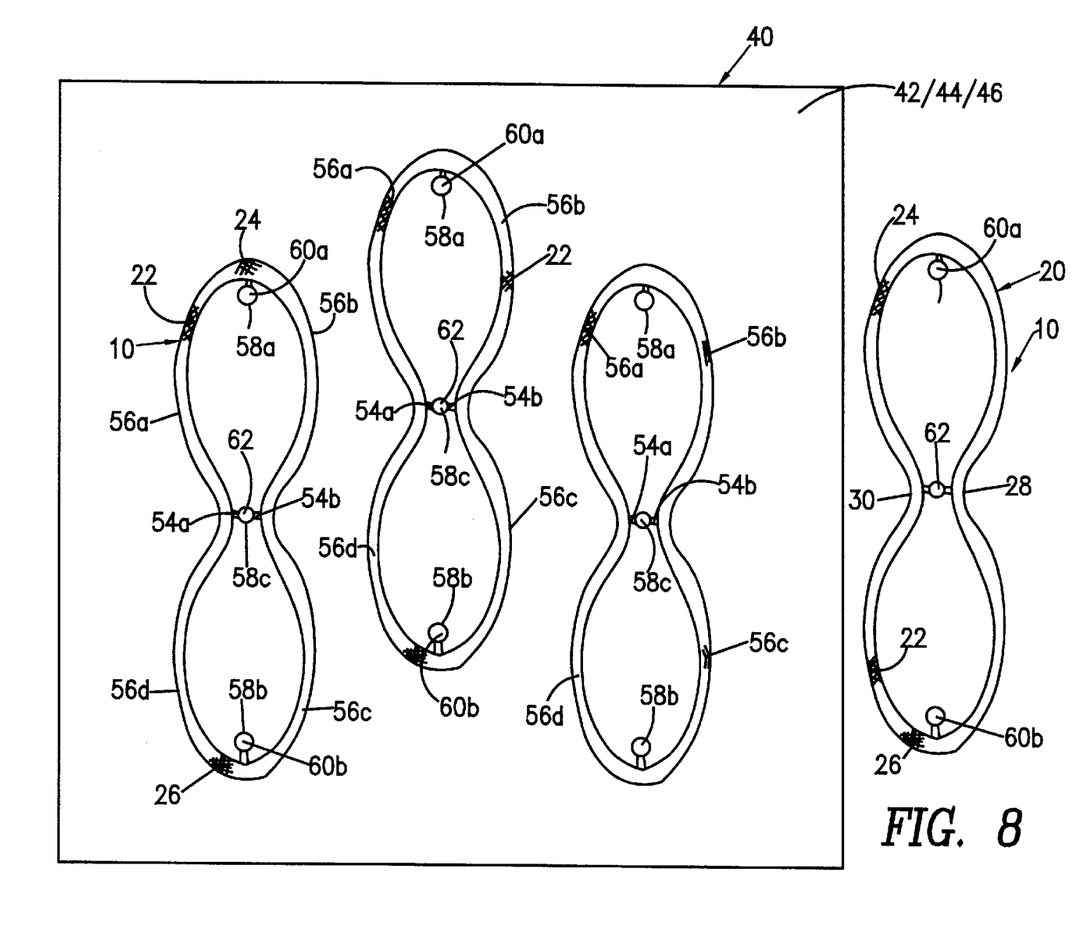
FIG. 8 is a top plan view of the figure-eight shaped drive belt of the present invention showing a runnerless injection mold for forming three (3) figure-eight configurations.

The figure-eight shaped drive belt 10 and its component parts of the preferred embodiment of the present invention are represented in detail by FIGS. 1, 2 7A, 8 and 10 of the patent drawings. The figure-eight shaped drive belts 10 are used within the plurality of pulley systems 12 of a mail sorting apparatus or other machines 14, as shown in FIG. 7A of the patent drawings. The figure-eight shaped drive belt 10 includes a shaped configuration 20 in the form of a figure-eight, dog bone or bow tie, as depicted in FIG. 1 of the drawings, and made from a thermoplastic elastomeric resin material 22. The figure-eight shaped drive belt 10 is made from a injection moldable thermoplastic elastomeric plastic resin material 22 selected from the group consisting of polyurethane, polyolefins, styrenic, polyesther and other thermoplastic resins. In particular, the resin material 22 is a thermoplastic polyurethane, such as the commercial thermoplastic polyurethane elastomer ELASTOLLAN® C90A13. Alternatively, the resin material 22 is a thermoset elastomeric plastic resin material such as BUNAN™, VITON™, NEOPRENE™ and equivalent thereof. This thermoplastic polyurethane has the following characteristics: a Shore hardness A of 93, a density of 1.205 grams per cubic centimeter, a tensile strength of 6525 psi, an elongation at break of 550% and a tear strength of 803 pounds per foot-inch. The molten resin material 22 is injected into a molding unit 40 during the mold filling process of a conventional or runnerless injection mold 42 or a hot-runner injection mold 44, or a hot/cold runner injection mold 46, respectively, as shown in FIG. 8 of the drawings.

The figure-eight shaped drive belt 10 includes first and second circular-shaped loops 24 and 26 each being integrally connected at two inwardly tapered or curved center sections 28 and 30, respectively, as depicted in FIG. 1. Drive belt 10 also includes first and second circular cross-sectional areas 32 and 34, as shown in FIG. 2 of the drawings.

For example, the shaped drive belt 10 which is used for a sorting apparatus has the following geometric construction dimensions, each of the circular-shaped loops 24 and 26 have a radius $r_1$ and $r_2$ in the range reasonable for the production process being 32 mm to 35 mm each, and a cross-sectional belt diameter $d_1$ and $d_2$ as required such as 4 mm for drive belt 10. Additionally, each of the circular looped ends 24 and 26 also include curvature arcs 25 and 27 having angles $\alpha_1$ and $\alpha_2$ in the range of 250° to 260°, respectively, as shown in FIG. 1 of the drawings. Each of the curved center sections 28 and 30 intersects the first and second circular-shaped loops 24 and 26 at tangent angles $\beta_1$ and $\beta_2$ in the range of 5° to 20°, respectively. The overall length $L_1$ of drive belt 10 is determined by the number of injection points (gates) being in the range of 200 mm to 210 mm with an ($r_1$ to $r_2$) interior (radius to radius point) length $L_2$ of drive belt 10 corresponding to the prior described geometric construction being in the range of 133 mm to 143 mm. The two curved center sections 28 and 30 are separated by a distance ($W_1$), as shown in FIG. 2, in the range of 18 mm to 20 mm.

The shaped drive belt 10 has the following overall geometric dimensions: each of the circular-shaped loops 24 and 26 having a radius $r_1$ and $r_2$ in the range of 2 mm to 98 mm, and a cross-sectional belt diameter $d_1$ and $d_2$ in the range of 1 mm to 15 mm. The length $L_1$ of drive belt 10 is in the range of 10 mm to 610 mm with an ($r_1$ to $r_2$) interior (radius to radius point) length $L_2$ of drive belt 10 being in the range 6 mm to 420 mm. The two curved center sections 28 and 30 are separated by a distance ($W_1$), as shown in FIG. 2, in the range of 2 mm to 56 mm.

First Alternate Embodiment 100

Figures 3, 4:
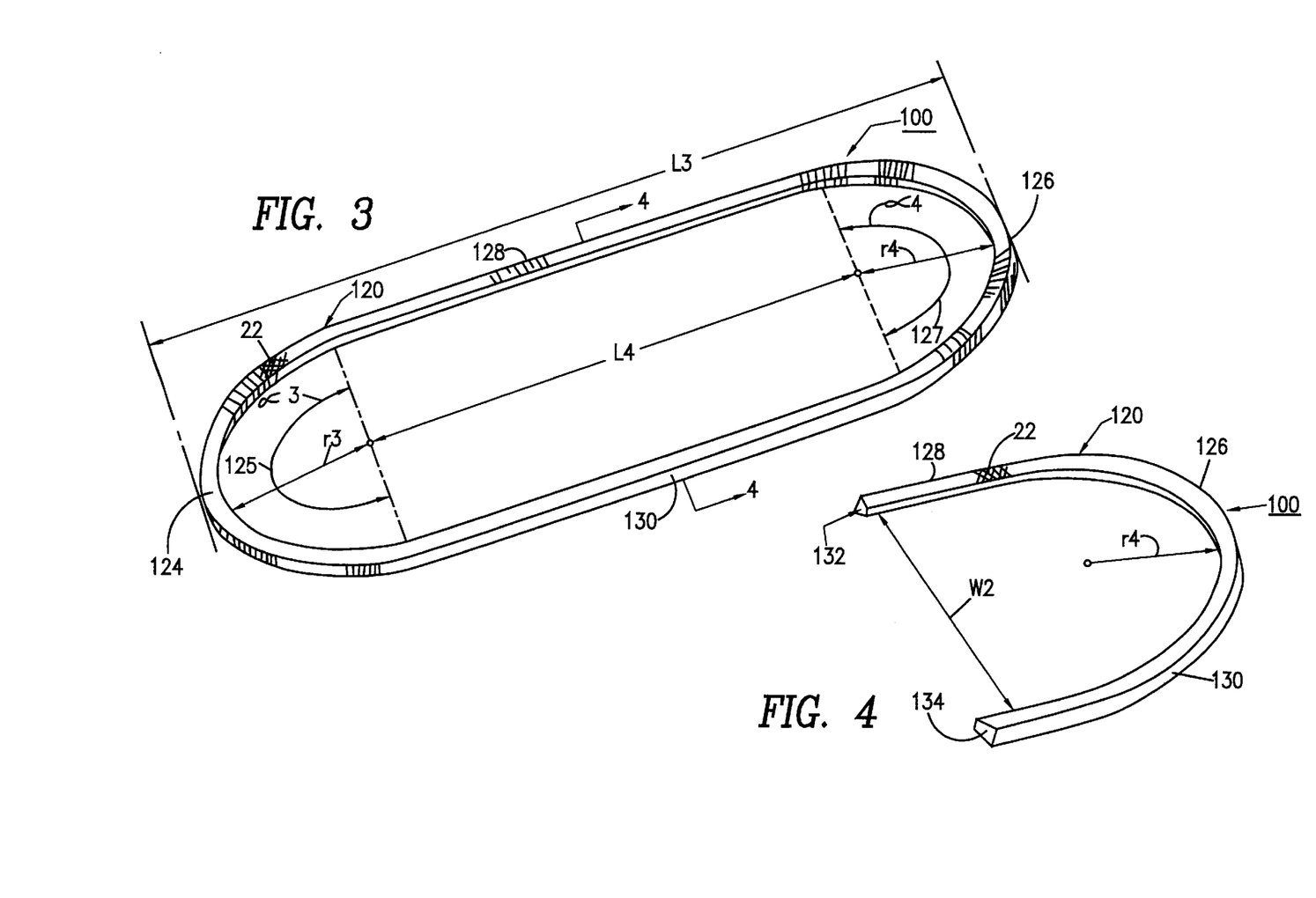
FIG. 3 is a front perspective view of the oval shaped drive belt of the first alternate embodiment of the present invention showing the shaped drive belt having first and second semi-circular looped ends being integrally connected at two center sections.
FIG. 4 is a front perspective view of the oval shaped drive belt of the present invention take along lines 4—4 of FIG. 3 showing the first and second trapezoid cross-sectional areas of the two center sections of the shaped drive belt.
Figure 7B:
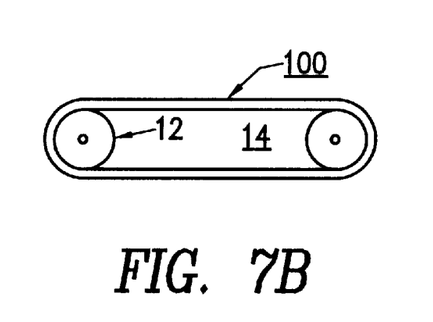
FIG. 7B is a top plan view of the oval shaped drive belt of the present invention showing the shaped drive belt within a pulley system having multiple pulleys therein being used in an operational mode.
Figure 7C:
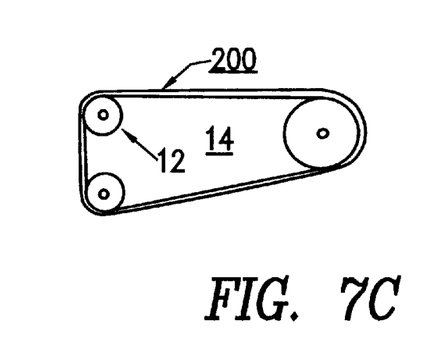
FIG. 7C is a top plan view of the ellipsoidal shaped drive belt of the present invention showing the shaped drive belt within a pulley system having multiple pulleys therein being used in an operational mode.
Figure 7D:
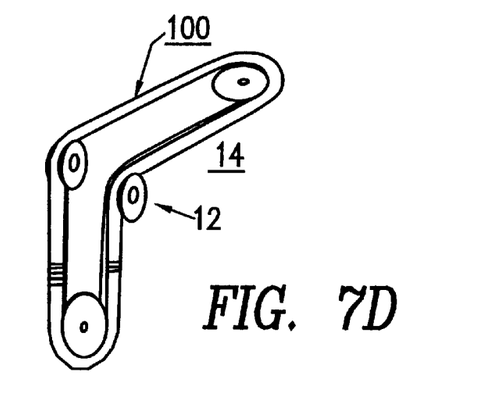
FIG. 7D is a front perspective view of the oval shaped drive belt of the present invention showing the shaped drive belt within a pulley system having multiple pulleys therein being used in an operational mode.

The oval shaped drive belt 100 and its component parts of the first alternate embodiment of the present invention are represented in detail by FIGS. 3, 4, 7B, 7D and 10 of the patent drawings. The oval shaped drive belts 100 are used in different configurations of pulley systems 12 as shown in FIGS. 7B and 7D for various types of machine devices 14. The oval shaped drive belt 100 includes a shaped configuration 120 in the form of an elongated oval, as depicted in FIG. 3 of the drawings, and made from a thermoplastic elastomeric resin material 22. The molten resin material 22 is injected into a molding unit 40 during the mold filling process of a conventional or runnerless injection mold 42, or a hot-runner injection mold 44, or a hot/cold runner injection mold 46, respectively.

The oval shaped drive belt 100 includes first and second semi-circular loops 124 and 126 each being integrally connected at two center sections 128 and 130 being parallel to each other, respectively, as depicted in FIG. 3. Drive belt 100 also includes first and second trapezoidal cross-sectional areas 132 and 134, as shown in FIG. 4 of the drawings.

The shaped drive belt 100 has the following overall geometric construction dimensions: each of the semi-circular loops 124 and 126 have a radius $r_3$ and $r_4$ in the range (reasonable for the production process) of 2 mm to 98 mm. The trapezoidal cross-sectional belt measurements includes a depth in the range of 1 mm to 15 mm, a first width in the range of 1 mm to 15 mm and a second width in the range of 3 mm to 45 mm. Additionally, each of the semicircular-shaped loops 124 and 126 also include curvature arcs 125 and 127 having angles $\alpha_3$ and $\alpha_4$ in the range of 178° to 182°, respectively, as shown in FIG. 3 of the drawings. The overall length $L_3$ of drive belt 100 is determined by the number of injection points (gates) being in the range of 10 mm to 610 mm with an ($r_3$ to $r_4$) interior (radius to radius point) length $L_4$ of drive belt 100 corresponding to the prior described geometric construction being in the range of 6 mm to 420 mm. The two parallel center sections 128 and 130 are separated by a distance ($W_2$), as shown in FIG. 4, in the range of 4 mm to 200 mm.

Second Alternate Embodiment 200

Figures 5, 6:
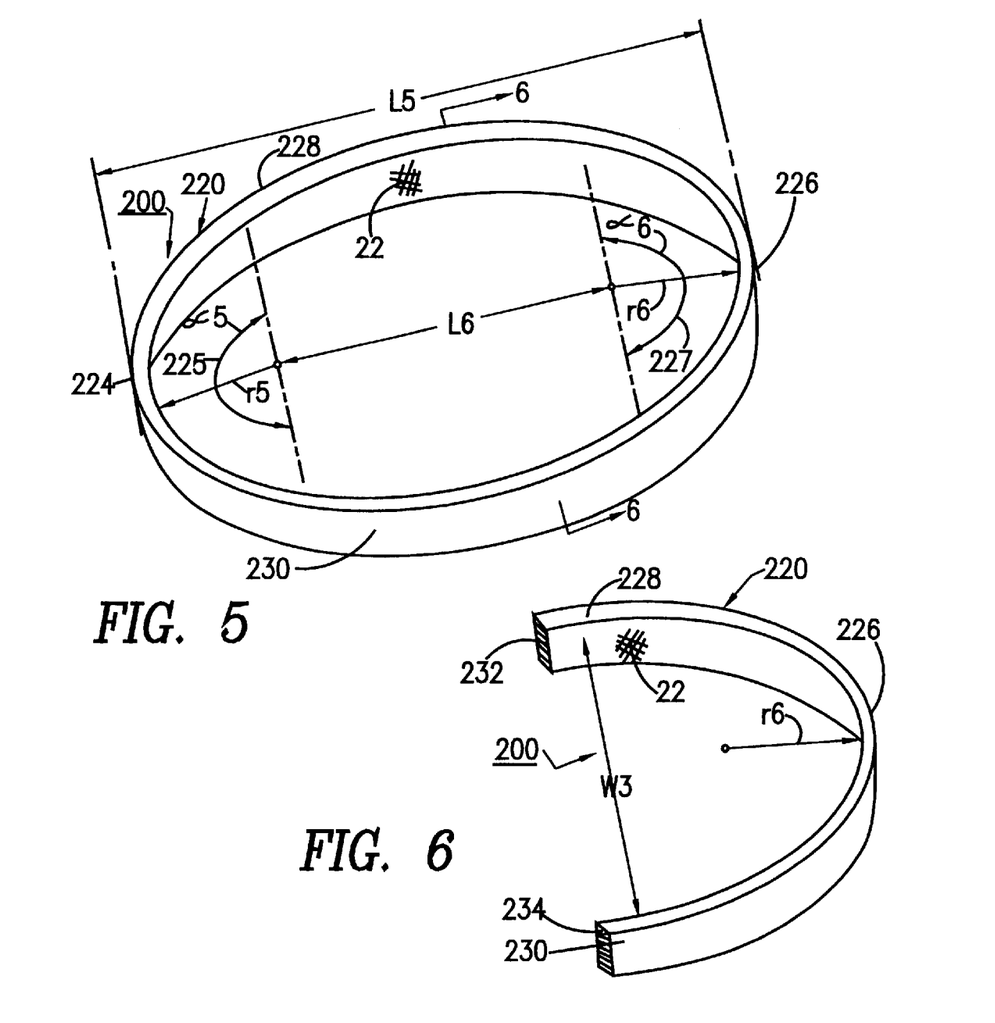
FIG. 5 is a front perspective view of the ellipsoidal shaped drive belt of the second alternate embodiment of the present invention showing the shaped drive belt having first and second elliptical looped ends being integrally connected at two outwardly arced center sections.
FIG. 6 is a front perspective view of the ellipsoidal shaped drive belt of the present invention taken along lines 6—6 of FIG. 5 showing the first and second rectangular cross-sectional areas of the two outwardly arced center sections of the shaped drive belt.
Figure 7E:
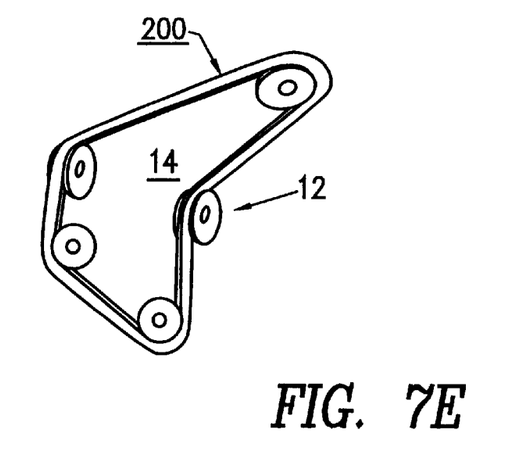
FIG. 7E is a front perspective view of the ellipsoidal shaped drive belt of the present invention showing the shaped drive belt within a pulley system having multiple pulleys therein being used in an operational mode.

The ellipsoidal shaped drive belt 200 and its component parts of the second alternate embodiment of the present invention are represented in detail by FIGS. 5, 6, 7C, 7E and 10 of the patent drawings. The ellipsoidal shaped drive belts 200 are used in different configurations of pulley systems 12 as shown in FIGS. 7C and 7E for various types of machine devices 14. The ellipsoidal shaped drive belt 200 includes a shaped configuration 220 in the form of an elongated ellipse, as depicted in FIG. 5 of the drawings, and made from a thermoplastic elastomeric resin material 22. The molten resin material 22 is injected into a molding unit 40 during the mold filling process of a conventional or runnerless injection mold 42, or a hot-runner injection mold 44, or a hot/cold runner injection mold 46, respectively.

The ellipsoidal shaped drive belt 200 includes first and second elliptical-shaped or arc-shaped loops 224 and 226 each being integrally connected at two outwardly arc-shaped or curved center sections 228 and 230, respectively, as depicted in FIG. 5. Drive belt 200 also includes first and second rectangular cross-sectional areas 232 and 234, as shown in FIG. 6 of the drawings.

The shaped drive belt 200 has the following geometric construction dimensions: each of the arc-shaped loops 224 and 226 have a radius $r_5$ and $r_6$ in the range (reasonable for the production process) of 2 mm to 98 mm each. The rectangular cross-sectional belt measurements include a thickness in the range of 1 mm to 15 mm, and width in the range of 4 mm to 60 mm. Additionally, each of the arc-shaped loops 224 and 226 also include curvature arcs 225 and 227 having $\alpha_5$ and $\alpha_6$ in the range of 130° to 175°, respectively, as shown in FIG. 5 of the drawings. The overall length $L_5$, of drive belt 200 is [determined by the number of injection points (gates)] being in the range of 10 mm to 610 mm with an ($r_5$ and $r_6$) interior (radius to radius point) length $L_6$ of drive belt 200 corresponding to the prior described geometric construction being in the range of 6 mm to 420 mm. The two outwardly curved center sections 228 and 230 are separated by a distance ($W_3$), as shown in FIG. 6, in the range of 8 mm to 400 mm.

It should be understood each of the shaped drive belts 10, 100 or 200 can have different cross-sectional configurations that include circular, rectangular, square, V-shaped or trapezoid-shaped cross sections.

Operation of the Invention

The method of the injection molding process 400 for the manufacture of a shaped drive belt 10, 100 or 200, is shown in FIGS. 8, 9A to 9C and 10 of the patent drawings. The method of the injection molding process 400 includes the following steps of drying of the thermoplastic resin material 410; transferring of the thermoplastic resin material 420; heating of the resin material 430; injecting the molten resin material 440; cooling of the molded resin material 450; and ejecting the formed and cooled resin in material of a shaped drive belt 460. Processing and molding steps 410, 420, 430, 440, 450 and 460 are all automatically performed within the molding machine 432 having a drier apparatus 412, a screw-feeder apparatus, a plasticizing unit and a molding unit 40 thereof.

Figure 9A:
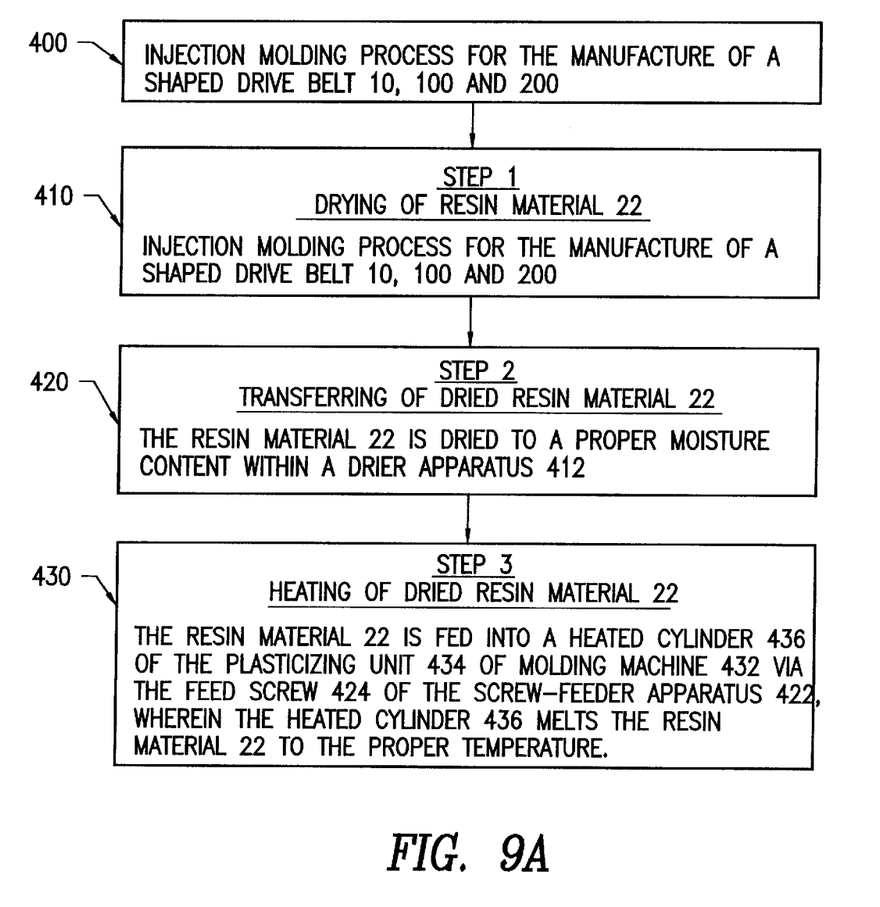
FIG. 9A is a schematic block diagram of the process method of producing a figure-eight shaped drive belt showing the steps of drying of resin material, transferring of resin material, and heating of resin material.

To start the molding process 400, the molding operator initially loads the drier apparatus 412 with thermoplastic resin material 22 in the form of plastic pellets. The resin material is then dried to a proper moisture content within the drier apparatus 412 for step 410 of the molding process 400.

After drying process has been completed, and the dried resin material 22 had reached its proper moisture content, the next processing step 420 is the transferring of the dried resin material 22 by a screw-feeder apparatus 422 to a plasticizing unit 434 of the molding machine 432 to initiate the melting of the dried resin material 22.

The next step 430 is the heating of the dried resin material 22 to a molten state. The resin material 22 is fed into a heated cylinder 436 of the plasticizing unit 434 of molding machine 432 via the feed screw 424 of the screw-feeder apparatus 422, wherein the heated cylinder 436 melts the resin material 22 to the proper temperature.

The following step 440 is the injecting of the molten resin material 22 within a molding unit 40, as depicted in FIG. 8 of the drawings. The first sub-step 442 has the molten resin material being transferred and injected into a cooled molding unit 40, such as a conventional or runnerless injection mold 42, or a hot-runner injection mold 44, or a hot/cold runner injection mold 46. The molten resin material 22 is then injected by the same feed screw 424 (now acting as a plunger) and transfers the molten resin material 22 within the molding unit 40.

The second sub-step 444 has the molten resin material 22 now being fed into one or more heated feeding tubes 52 connected to the molding unit 40 and the molten resin 22 enters one or more feed points/gates 54a and 54b, wherein the maximum flow path of the molten resin material 22 within each of the shaped mold cavity sections 56a to 56d is less than 8 inches, as shown in FIG. 8 of the drawings.

The third sub-step 446 has the molten resin material 22 being allowed to fill each of the shaped mold cavity sections 56a to 56d, such that the molten resin material 22 fills a pair of opposing overflow slug cavities 58a and 58b located at each of the looped ends 24 and 26; 124 and 126 and 224 and 226 of shaped drive belts 10, 100 and 200, respectively. These overflow slug cavities 58a and 58b having molten resin material 22 therein form slugs 60a and 60b which are used to eject or demold the shaped drive belt 10, 100 or 200 from the molding unit 40. Also, a slug 62 is formed from feed gates 54a and 54b within an overflow slug cavity 58c which is also used to demold the shaped drive belt 10, 100 or 200 from the molding unit 40, as shown in FIG. 8 of the drawings.

The next step 450 is the cooling of the molten resin material 22 into the solid and form shaped drive belts 10, 100 and 200, respectively. The molten resin material 22 is then allowed to be cooled within the mold cavity sections 56a to 56d; and the slug cavities 58a, 58b and 58c which form slugs 60a, 60b and 62, respectively. The thermoplastic resin material 22 is cooled to a solid state via water cooled channels 438 within the cooled molding unit 40 for a specific time period.

Figure 9C:
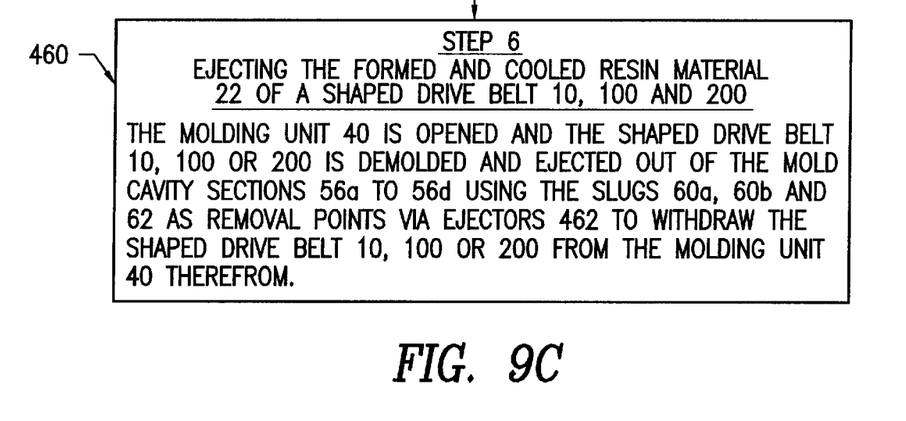
FIG. 9C is a schematic block diagram of the process method of producing a figure-eight shaped drive belt showing the step of ejecting the formed and cooled resin material of a shaped drive belt.
Figure 10:
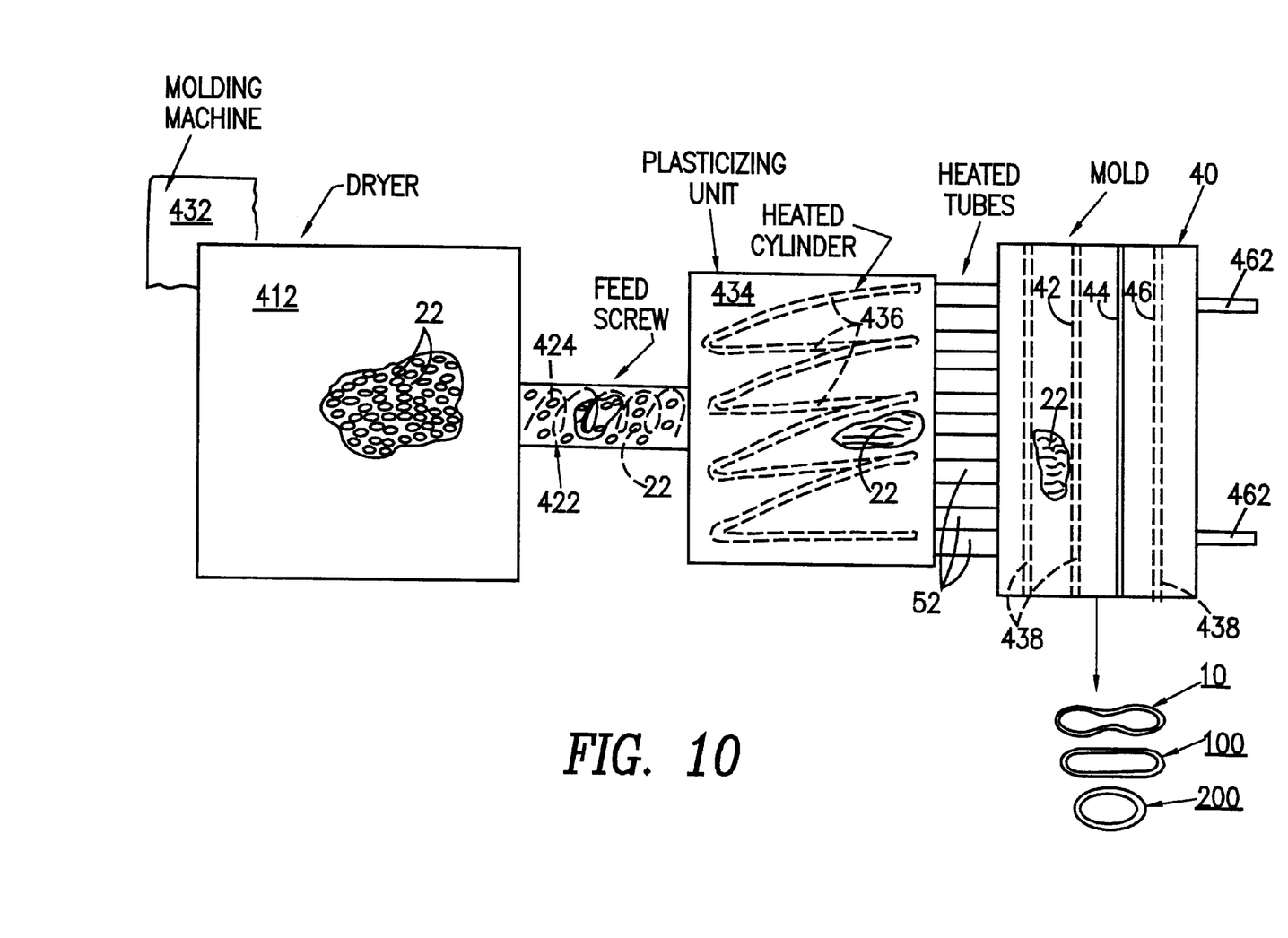
FIG. 10 is a schematic representation of the process method of producing a shaped drive belt showing the major processing equipment in the manufacturing of the shaped drive belts.

The final/last step 460 is the ejecting from the molding unit 40 the formed and cooled resin material 22 of a shaped drive belt 10, 100 or 200, respectively. The molding unit 40 is then opened and the shaped drive belt 10, 100 or 200 is demolded and ejected out of the mold cavity sections 56a to 56d using the slugs 60a, 60b and 62 as removal points via ejectors 462 to withdraw the shaped drive belt 10, 100 or 200 from the molding unit 40 therefrom.

The aforementioned steps 410, 420, 430, 442, 444, 446, 450 and 460 complete the molding process 400 in which to manufacture the various configurations of the figure-eight, oval and elliptical shaped drive belts 10, 100 and 200, respectively, having different cross-sectional structures of circle, trapezoid (V-shaped) and rectangle, respectively. The optimum molding unit 40 would have a plurality of molding cavities that would produce at least 3 to 4 units of a shaped drive belt 10, 100 or 200, respectively, depending upon the overall length of the drive belt being manufactured.

Shaped drive belts 10, 100 or 200 can be used in various types of pulley systems 12 of many different machine devices 14, as depicted in FIGS. 7A to 7E of the patent drawings. Atypical pulley configurations 12, as shown in FIGS. 7A, 7D and 7E, show each of the shaped drive belts 10, 100 and 200, respectively, being able to rotate the shaped drive belt in a 90° rotation (2nd position) perpendicular from a first position. Standard non-shaped drive belts are not normally used for these rotational pulley system 12 configurations. An alternate molding process can be used such that a thermoset plastic material is used in standard molding devices where the drive belt 10, 100 or 200 is cured with heat.

Advantages of the Present Invention

Accordingly, an advantage of the present invention is that it provides for a dog bone, bow tie or figure-eight shaped drive belt for use in mail sorting equipment in the U.S. Postal Service.

Another advantage of the present invention is that it provides for a figure-eight shaped drive belt in order to facilitate the easy installation of the shaped drive belts within the pulley systems of the mail sorting equipment, or other similar equipment.

Another advantage of the present invention is that it provides for a figure-eight shaped drive belt that allows for a simpler and more economical construction of a conventional runnerless, or hot-runner, or hot/cold injection mold.

Another advantage of the present invention is that it provides for a figure-eight shaped drive belt that allows for a shorter flow of the molten resin material during the filling injection process which results in a better and higher quality drive belt part in respect to wear, endurance and useful life of the drive belt.

Another advantage of the present invention is that it provides for a figure-eight shaped drive belt that allows for a reduced tooling size of the injection mold, as compared to the conventional round shaped injection mold in present use.

Another advantage of the present invention is that it provides for a figure-eight shaped drive belt that allows for smaller packaging, thus less costly.

A further advantage of the present invention is that it provides for a figure-eight shaped drive belt that can be mass produced in a simpler or multiple cavity mold being manufactured in an automated and economical manner and is readily affordable by the user.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A preformed dog bone shaped drive belt for use within a pulley system, comprising:

a) a drive belt having a preformed dog bone configuration which remains in said dog bone configuration when said drive belt is in a non-tensioned state;

b) said dog bone configuration including a first circular-shaped loop and a second circular-shaped loop; and c) said first and second circular-shaped loops being integrally connected by two curved center sections to form an endless drive belt having said preformed dog bone shaped configuration when in a non-tensioned state.

2. A dog bone shaped drive belt in accordance with claim 1, wherein said two curved center sections are curved in opposite directions.

3. A dog bone shaped drive belt in accordance with claim 1, wherein said first and second circular-shaped loops each form an arc in the range of 240° to 250°.

4. A dog bone shaped drive belt in accordance with claim 3, wherein each curved center sections intersects said first and second circular-shaped loops at a tangent angle in the range of 5° to 20°.

5. A dog bone shaped drive belt in accordance with claim 4, wherein each of said curved center sections has a radius of curvature in range of 100 mm to 220 mm.

6. A dog bone shaped drive belt in accordance with claim 1, wherein said first circular-shaped loop has a first radius in the range of 32 mm to 35 mm, and wherein said second circular-shaped loop has a second radius in the range of 32 mm to 35 mm.

7. A dog bone shaped drive belt in accordance with claim 6, wherein said drive belt has a length in the range of 133 mm to 143 mm between said first radius and said second radius.

8. A dog bone shaped drive belt in accordance with claim 1, wherein said shaped drive belt has an overall length in the range of 200 mm to 210 mm.

9. A dog bone shaped drive belt in accordance with claim 1, wherein said two curved center sections are separated by a distance in the range of 18 mm to 20 mm.

10. A dog bone shaped drive belt in accordance with claim 1, wherein said first circular-shaped loop has a first radius in the range of 2 mm to 98 mm, and wherein said second circular-shaped loop has a second radius in the range of 2 mm to 98 mm.

11. A dog bone shaped drive belt in accordance with claim 10, wherein said drive belt has a length in the range of 6 mm to 420 m between said first radius and said second radius.

12. A dog bone shaped drive belt in accordance with claim 1, wherein said shaped drive belt has an overall length in the range of 10 mm to 610 mm.

13. A dog bone shaped drive belt in accordance with claim 1, wherein said two curved center sections are separated by a distance in the range of 2 mm to 56 mm.

14. A dog bone shaped drive belt in accordance with claim 1, wherein said shaped drive belt has a geometric shaped cross-section selected from the group consisting of a circle, a rectangle, a square, a triangle, and a trapezoid.

15. A dog bone shaped drive belt in accordance with claim 14, wherein said shaped drive belt having a circular cross-section has a diameter of 4 mm.

16. A dog bone shaped drive belt in accordance with claim 14, wherein said shaped drive belt having a circular cross-section has diameter in the range of 1 mm to 15 mm.

17. A dog bone shaped drive belt in accordance with claim 14, wherein said shaped drive belt having a trapezoidal cross-section has a first width in the range of 1 mm to 15 mm, a second width in the range of 3 mm to 45 mm, and a belt thickness in the range of 1 mm to 15 mm.

18. A dog bone shaped drive belt in accordance with claim 14, wherein said shaped drive belt having a rectangular cross-section has a width in the range of 4 mm to 60 mm, and a belt thickness in the range of 1 mm to 15 mm.

19. A dog bone shaped drive belt in accordance with claim 1, wherein said shaped drive belt is made from a non-expandable, thermoplastic elastomeric or thermoset elastomeric resin material.

20. A dog bone shaped drive belt in accordance with claim 19, wherein the thermoplastic elastomeric resin material is selected from the group consisting of polyurethane, polyolefins, styrenic, polyesther and other thermoplastic resins.

* * * * *